(12) United States Patent
Perera et al.

(10) Patent No.: US 7,352,745 B2
(45) Date of Patent: Apr. 1, 2008

(54) SWITCHING SYSTEM WITH DISTRIBUTED SWITCHING FABRIC

(75) Inventors: Ananda Perera, Irvine, CA (US); Edwin Hoffman, Irvine, CA (US)

(73) Assignee: Raptor Networks Technology, Inc., Santa Ana, CA (US)

(*) Notice: Subject to any disclaimer, the term of this patent is extended or adjusted under 35 U.S.C. 154(b) by 0 days.

(21) Appl. No.: 11/610,281

(22) Filed: Dec. 13, 2006

(65) Prior Publication Data

US 2007/0071014 A1    Mar. 29, 2007

Related U.S. Application Data

(63) Continuation of application No. 10/965,444, filed on Oct. 12, 2004.

(60) Provisional application No. 60/563,262, filed on Apr. 16, 2004, provisional application No. 60/511,145, filed on Oct. 14, 2003, provisional application No. 60/511,144, filed on Oct. 14, 2003, provisional application No. 60/511,143, filed on Oct. 14, 2003, provisional application No. 60/511,142, filed on Oct. 14, 2003, provisional application No. 60/511,141, filed on Oct. 14, 2003, provisional application No. 60/511,140, filed on Oct. 14, 2003, provisional application No. 60/511,139, filed on Oct. 14, 2003, provisional application No. 60/511,138, filed on Oct. 14, 2003, provisional application No. 60/511,021, filed on Oct. 14, 2003, provisional application No. 60/563,262, filed on Apr. 16, 2004.

(51) Int. Cl.
*H04L 12/56* (2006.01)

(52) U.S. Cl. .................................................... 370/389

(58) Field of Classification Search ...................... None
See application file for complete search history.

(56) References Cited

U.S. PATENT DOCUMENTS

| | | | |
|---|---|---|---|
| 6,151,324 A * | 11/2000 | Belser et al. ................ | 370/397 |
| 7,016,350 B2 * | 3/2006 | Piekarski et al. ........... | 370/390 |
| 2002/0027908 A1 | 3/2002 | Kalkunte et al. | |
| 2002/0081063 A1 | 6/2002 | Drews et al. | |
| 2002/0089972 A1 | 7/2002 | Chang et al. | |
| 2002/0167950 A1 | 11/2002 | Chang et al. | |
| 2002/0191250 A1 * | 12/2002 | Graves et al. .............. | 359/128 |
| 2003/0067925 A1 | 4/2003 | Choe et al. | |
| 2003/0076846 A1 * | 4/2003 | Heinz et al. ................. | 370/404 |
| 2004/0028158 A1 * | 2/2004 | Fujimori et al. ............ | 375/350 |
| 2004/0109465 A1 * | 6/2004 | Kim et al. ................... | 370/419 |
| 2005/0031347 A1 * | 2/2005 | Soto et al. .................... | 398/58 |
| 2007/0031153 A1 * | 2/2007 | Aronson et al. ............ | 398/138 |

* cited by examiner

*Primary Examiner*—Anh-Vu Ly
(74) *Attorney, Agent, or Firm*—Fish & Associates, PC.

(57) ABSTRACT

A switch encapsulates incoming information using a header, and removes the header upon egress. The header is used by both distributed ingress nodes and within a distributed core to facilitate switching. The ingress and egress elements preferably support Ethernet or other protocol providing connectionless media with a stateful connection. Preferred switches include management protocols for discovering which elements are connected, for constructing appropriate connection tables, for designating a master element, and for resolving failures and off-line conditions among the switches. Secure data protocol (SDP), port to port (PTP) protocol, and active/active protection service (AAPS) are all preferably implemented. Systems and methods contemplated herein can advantageously use Strict Ring Topology (SRT), and conf configure the topology automatically. Components of a distributed switching fabric can be geographically separated by at least one kilometer, and in some cases by over 150 kilometers.

8 Claims, 9 Drawing Sheets

SWITCHING SYSTEM WITH DISTRIBUTED SWITCHING FABRIC

This application is a continuation of U.S. patent application Ser. No. 10/965,444 filed Oct. 12, 2004 which claims priority to provisional application No. 60/511,145 filed Oct. 14, 2003; provisional application No. 60/511,144 filed Oct. 14, 2003; provisional application No. 60/511,143 filed Oct. 14, 2003; provisional application No. 60/511,142 filed Oct. 14, 2003; provisional application No. 60/511,141 filed Oct. 14, 2003; provisional application No. 60/511,140 filed Oct. 14, 2003; provisional application No. 60/511,139 filed Oct. 14, 2003; provisional application No. 60/511,138 filed Oct. 14, 2003; provisional application No. 60/511,021 filed Oct. 14, 2003; and provisional application No. 60/563,262 filed Apr. 16, 2004, all of which are incorporated herein by reference in their entirety.

FIELD OF THE INVENTION

The field of the invention is network switches.

BACKGROUND

Modern computer networks typically communicate using discrete packets or frames of data according to predefined protocols. There are multiple such standards, including the ubiquitous TCP and IP standards. For all but the simplest local topologies, networks employ intermediate nodes between the end-devices. Bridges, switches, and/or routers, are all examples of intermediate nodes.

As used herein, a network switch is any intermediate device that forwards packets between end-devices and/or other intermediate devices. Switches operate at the data link layer (layer 2) and sometimes the network layer (layer 3) of the OSI Reference Model, and therefore typically support any packet protocol. A switch has a plurality of input and output ports. Although a typical switch has only 8, 16, or other relatively small number of ports, it is known to connect switches together to provide large numbers of inputs and outputs. Prior art FIG. 1 shows a typical arrangement of switch modules into a large switch that provides 128 inputs and 128 outputs.

One problem with simple embodiments of the prior art design of FIG. 1 is that failure of any given switch destroys integrity of the entire switching system. One solution is to provide entire redundant backup systems (external redundancy), so that a spare system can quickly replace functionality of a defective system. That solution, however, is overly expensive because an entire backup must be deployed for each working system. The solution is also problematic in that the redundant system must be engaged upon failure of substantially any component within the working system. Another solution is to provide redundant modules within the system, and to deploy those modules intelligently (internal redundancy). But that solution is problematic because all the components are situated locally to one another. A fire, earthquake or other catastrophe will still terminally disrupt the functionality of the entire system.

U.S. Pat. No. 6,256,546 to Beshai (March 2002) describes a protocol that uses an adaptive packet header to simplify packet routing and increase transfer speed among switch modules. Beshai's system is advantageous because it is not limited to a fixed cell length, such as the 53 byte length of an Asynchronous Transfer Mode (ATM) system, and because it reportedly has better quality of service and higher throughput that an Internetworking Protocol (IP) switched network. The Beshai patent, is incorporated herein by reference along with all other extrinsic material discussed herein Prior art FIG. 1A depicts a system according to Beshai's '546 patent. There, pluralities of edge modules (ingress modules 110A-D and egress modules 130A-D) are interconnected by a passive core 120. Each of the ingress modules 110A-D accept data packets in multiple formats, adds a standardized header that indicates a destination for the packet, and switches the packets to the appropriate egress modules 130A-D through the passive core 120. At the egress modules 130A-D the header is removed from the packet, and the packet is transferred to a sink in its native format. The solid lines of 112A-112D depict unencapsulated information arriving to circuit ports, ATM ports, frame relay ports, IP ports, and UTM ports. Similarly, the solid lines of 132A-D depict unencapsulated information exiting to the various ports in the native format of the information. The dotted lines of core 120 and facing portions of the ingress 110A-D and egress 130A-D modules depict information that is contained UTM headed packets. The entire system 100 operates as a single distributed switch, in which all switching is done at the edge (ingress and egress modules).

Despite numerous potential advantages, Beshai's solution in the '546 patent has significant drawbacks. First, although the system is described as a multi-service switch (with circuit ports, ATM ports, frame relay ports, IP ports, and UTM ports), there is no contemplation of using the switch as an Ethernet switch. Ethernet offers significant advantages over other protocols, including connectionless stateful communication. A second drawback is that the optical core is contemplated to be entirely passive. The routes need to be set up and torn down before packets are switched across the core. As such Beshai does not propose a distributed switching fabric, he only discloses a distributed edge fabric with optical cross-connected cores. A third, related disadvantage, is that Beshai's concept only supports a single channel from one module to another. All of those deficiencies reduce functionality.

Beshai publication no. 2001/0006522 (Jul. 2001) resolves one of the deficiencies of the '546 patent, namely the single channel limitation between modules. In the '522 application Beshai teaches a switching system having packet-switching edge modules and channel switching core modules. As shown in prior art FIG. 1B, traffic entering the system through ports 162A is sorted at each edge module 160A-D, and switched to various core elements 180A-C via paths 170. The core elements switch the traffic to other destination edge modules 180A-C, for delivery to final destinations. Beshai contemplates that the core elements can use channel switching to minimize the potential wasted time in a pure TDM (time division mode) system, and that the entire system can use time counter co-ordination to realize harmonious reconfiguration of edge modules and core modules.

Leaving aside the switching mechanisms between and within the core elements, the channel switching core of the '522 application provides nothing more than virtual channels between edge devices. It does not switch individual packets of data. Thus, even though the '522 application incorporates by reference Beshai's Ser. No. 09/244824 application regarding High-Capacity Packet Switch (issued as U.S. Pat. No. 6,721,271 in April 2004), the '522 application still fails to teach, suggest, or motivate one of ordinary skill to provide a fully distributed network (edge and core) that acts as a single switch.

What is still needed is a switching system in which the switching takes place both at the distributed edge nodes and within a distributed core, and where the entire system acts as a single switch.

SUMMARY OF THE INVENTION

The present invention provides apparatus, systems, and methods in which the switching takes place both at the distributed edge nodes and within a distributed core, and where the entire system acts as a single switch through encapsulation of information using a special header that is added by the system upon ingress, and removed by the system upon egress.

The routing header includes as least a destination element address, and preferably also includes a destination port address, a source element address. Where the system is configured to address clusters of elements, the header also preferably includes a destination cluster address and a source cluster address.

The ingress and egress elements preferably support Ethernet or other protocol providing connectionless media with a stateful connection. At least some of the ingress and egress elements preferably have least 8 input ports and 8 output ports, and communicate at a speed of at least one, and more preferably at least 10 Gbs.

Preferred switches include management protocols for discovering which elements are connected, for constructing appropriate connection tables, for designating a master element, and for resolving failures and off-line conditions among the switches. Secure data protocol (SDP), port to port (PTP) protocol, and active/active protection service (AAPS) are all preferably implemented.

Systems and methods contemplated herein can advantageously use Strict Ring Topology (SRT), and conf configure the topology automatically. Other topologies can be can alternatively or additionally employed. Components of a distributed switching fabric can be geographically separated by at least one kilometer, and in some cases by over 150 kilometers.

Various objects, features, aspects and advantages of the present invention will become more apparent from the following detailed description of preferred embodiments of the invention, along with the accompanying drawings in which like numerals represent like components.

DETAILED DESCRIPTION

Figure 1A:
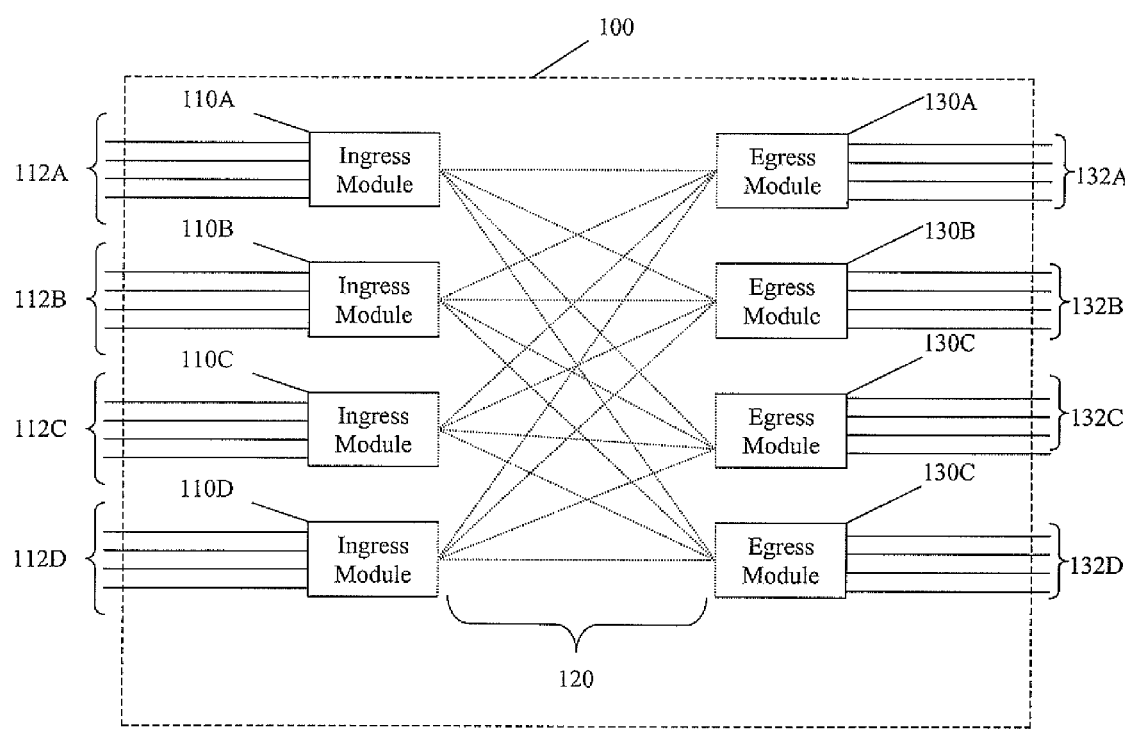
FIG. 1A is a schematic of a prior art arrangement of switch modules that cooperate to act as a single switch.
Figure 1B:
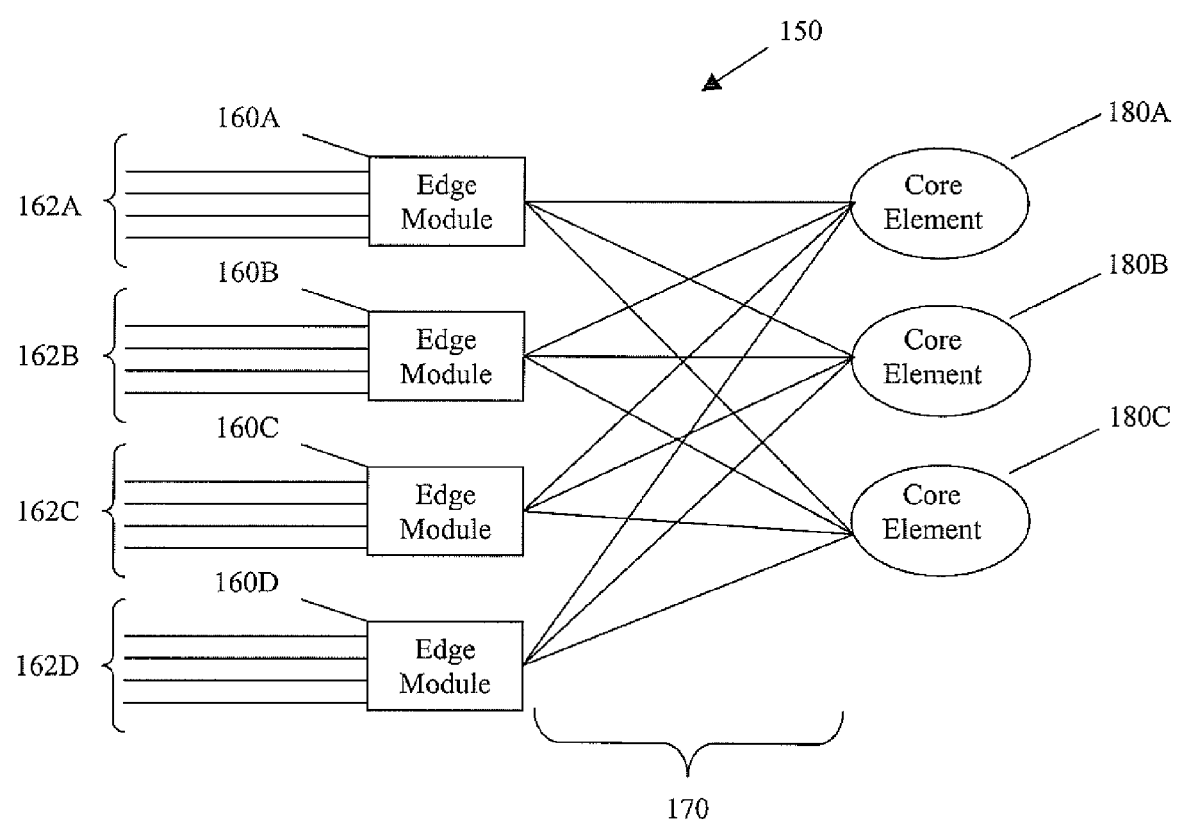
FIG. 1B is a schematic of a prior art arrangement of switch modules connected by an active core, but where the modules operate independently of one another.
Figure 2:
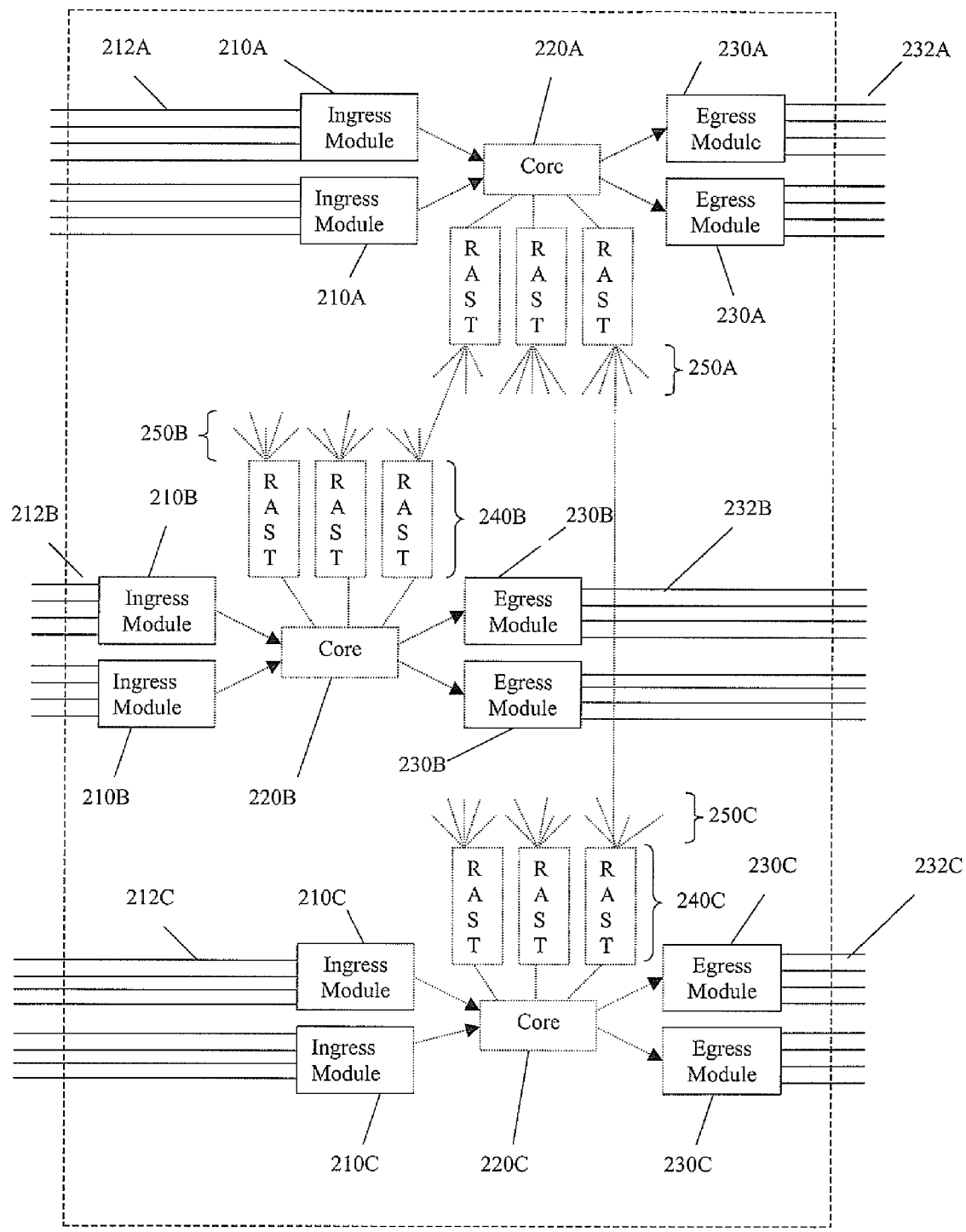
FIG. 2 is a schematic of a true distributed fabric switching system, in which edge elements add or remove headers, and the core actively switches packets according to the headers.

In FIG. 2 a switching system 200 generally includes ingress elements 210A-C, egress elements 230A-C, core switching elements 220A-C and connector elements 240A-C. The ingress elements encapsulate incoming packets with a routing header (see FIG. 3), and perform initial switching. The encapsulated packets then enter the core elements for further switching. The intermediate elements facilitate communication between core elements. The egress elements remove the header, and deliver the packets to a sink or final destination.

Figure 3:
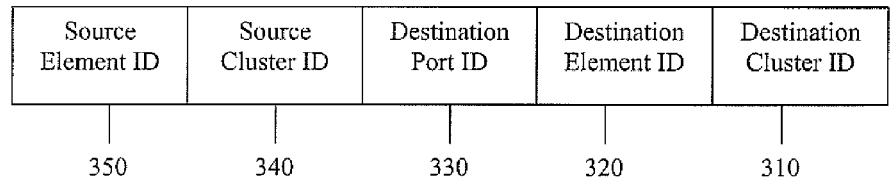
FIG. 3 is a schematic of a routing header.

Those skilled in the art will appreciate that switching (encapsulation) header must, at a bare minimum, include at least a destination element address. In preferred embodiments the header also includes destination port ID, and where elements are clustered and optional destination cluster ID. Also optional are fields for source cluster, source element, and source port IDs. As used herein an "ID" is something that is the same as, or can be resolved into an address. In FIG. 3 a preferred switching header 300 generally includes a Destination Cluster ID 310, a Destination Element ID 320, a Destination Port ID 330, a Source Cluster ID 340 and a Source Element ID 350. In this particular example, the each of the fields has a length of at least 1 byte and up to 2 bytes. Those skilled in the art should also appreciate that the term "header" is used here as in a euphemistic sense to mean any additional routing data that is included in a package that encapsulates other information. The header need not be located at the head end of the frame or packet.

Ingress 210A-C and egress 230A-C elements are shown in FIG. 2 as distinct elements. In fact, they are similar in construction, and they may be implemented as a single device. Such elements can have any suitable number of ports, and can operate using any suitable logic. Currently preferred chips to implement the design are Broadcom's™ BCM5690, BCM5670, and BCM5464S chips, according to the detailed schematics included in one or more of the priority provisional applications.

Figure 4:
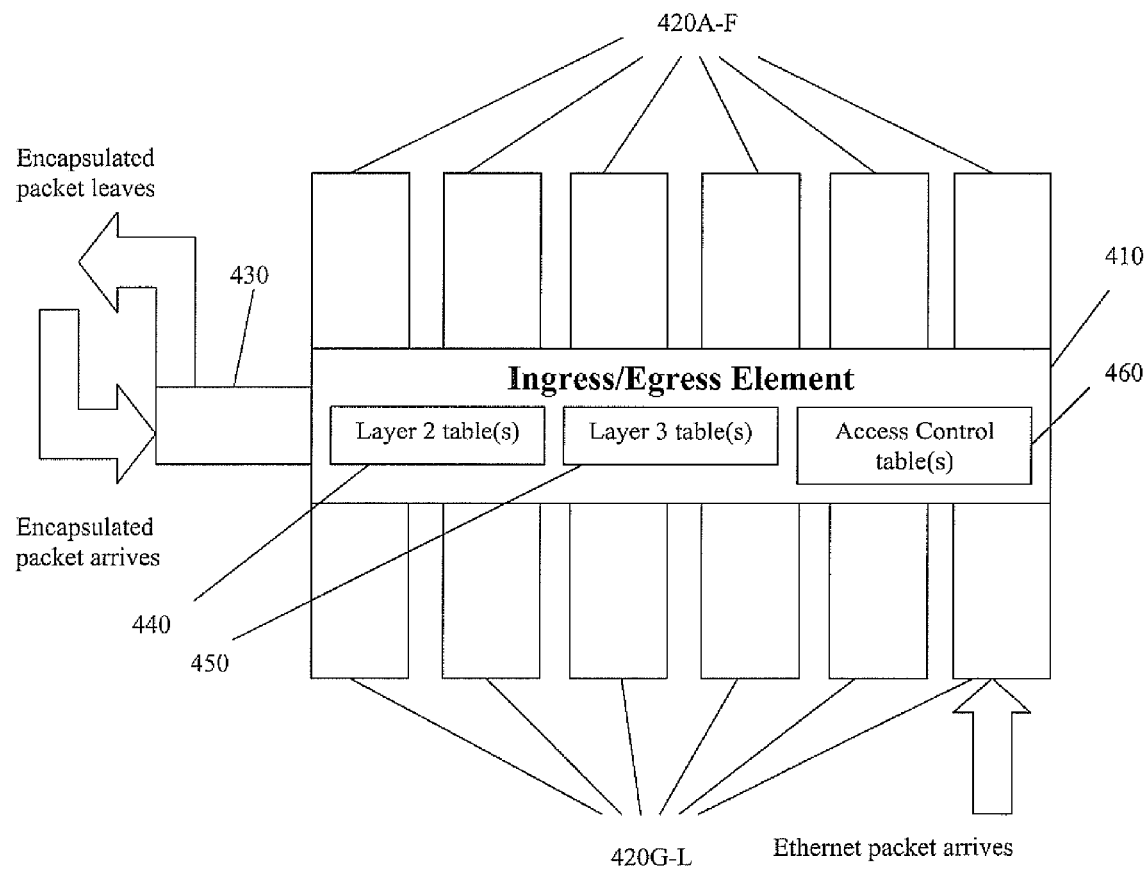
FIG. 4 shows a high level design of a preferred combination Ingress/Egress element

FIG. 4 shows a high level design of a preferred combination ingress/egress element 400, which can be utilized for any of the ingress 210A-C and egress 230A-C elements. Ingress/Egress element 400 generally includes a logical switching frame 410, Ethernet ingress/egress ports 420A-L, encapsulated packet I/O port 430, layer 2 table(s) 440, layer 3 table(s) 450, and access control table(s) 460.

Ingress/egress elements are the only elements that are typically assigned element IDs. When packets arrive at an ingress/egress port 420, it is assumed that all ISO layer 2 fault parameters are satisfied and the packet is correct. The destination MAC address is searched in the layer 2 MAC table 440, where the destination element ID and destination port ID are already stored. Once matched, the element and port IDs are placed into the switching header, along with the destination cluster ID, and source element ID. The resulting frame is then sent out to the core element.

When an encapsulated frame arrives, the ID is checked to make sure the packet is targeted to the particular element at which it arrived. If there is a discrepancy, the frame is checked to determine whether it is a multicast or broadcast frame. If it is a multicast frame, the internal switching header is stripped and the resulting packet is copied to all interested parties (registered IGMP "Internet Group Management Protocol" joiners). If it is a broadcast frame, the RAST header is stripped, and the resulting packet is copied to all ports except the incoming port over which the frame arrived. If the frame is a unicast frame, the element ID is stripped off, and the packet is cut through to the corresponding physical port.

Although ingress/egress elements could be single port, in preferred embodiments they would typically have multiple ports, including at least one encapsulated packet port, and at least one standards based port (such as Gigabit Ethernet). Currently preferred ingress/egress elements include 1 Gigabit Ethernet multi-port modules, and 10 Gigabit Ethernet single port modules. In other aspects of preferred embodiments, an ingress/egress element may be included in the same physical device with a core element. In that case the device comprises a hybrid core-ingress/egress device. See FIGS. 6 and 7.

Figure 5:
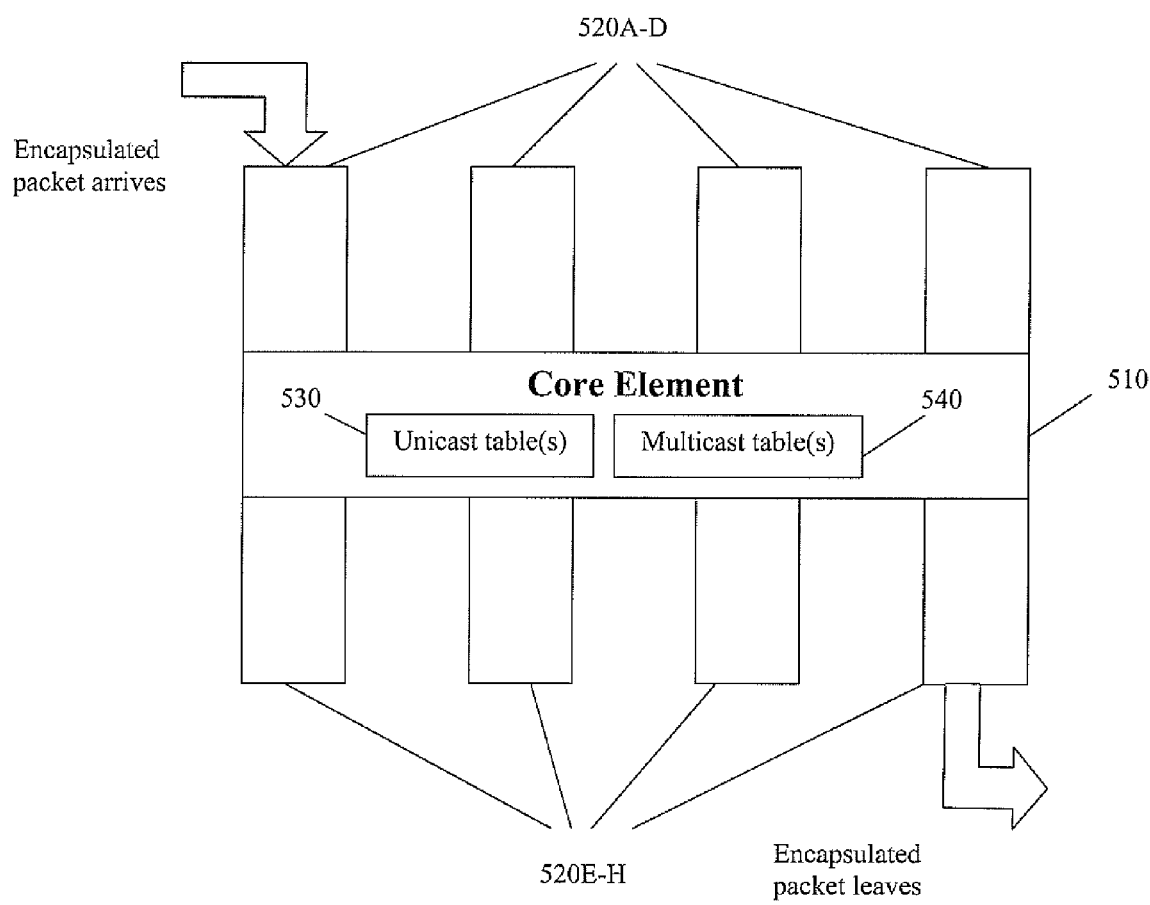
FIG. 5 shows a high level design of a preferred core element

FIG. 5 shows a high level design of a preferred core element 500, which can be utilized for any of the core switching elements 220A-C. Core element 500 generally includes a logical switching frame 510, a plurality of ingress and/or egress ports 520A-H, one or more unicast tables 530, one or more multicast tables 540.

When an encapsulated frame arrives at an ingress side of any port in the core element, the header is read for the destination ID. The ID is used to cut through the frame to the specific egress side port for which the ID has been registered. The unicast table contains a list of all registered element IDs that are known to the core element. Elements become registered during the MDP (Management Discovery Protocol) phase of startup. The multicast table contains element IDs that are registered during the "discovery phase" of a multicast protocol's joining sequence. This is where the multicast protocol evidences an interested party, and uses these IDs to decide which ports take part in the hardware copy of the frames. If the element ID is not known to this core element, or the frame is designated a broadcast frame, the frame floods all egress ports.

Connector elements 240A-C (depicted in FIG. 2 as RAST™, for Raptor Adaptive Switch Technology™ Header), are low level devices that allow the core elements to communicate with other core elements over cables or fibers. They assist in enforcing protocols, but have no switching functions. Examples of such elements are XAU1 over copper connectors XAU1/XGmil over fiber connectors using MSA XFP.

Figure 6:
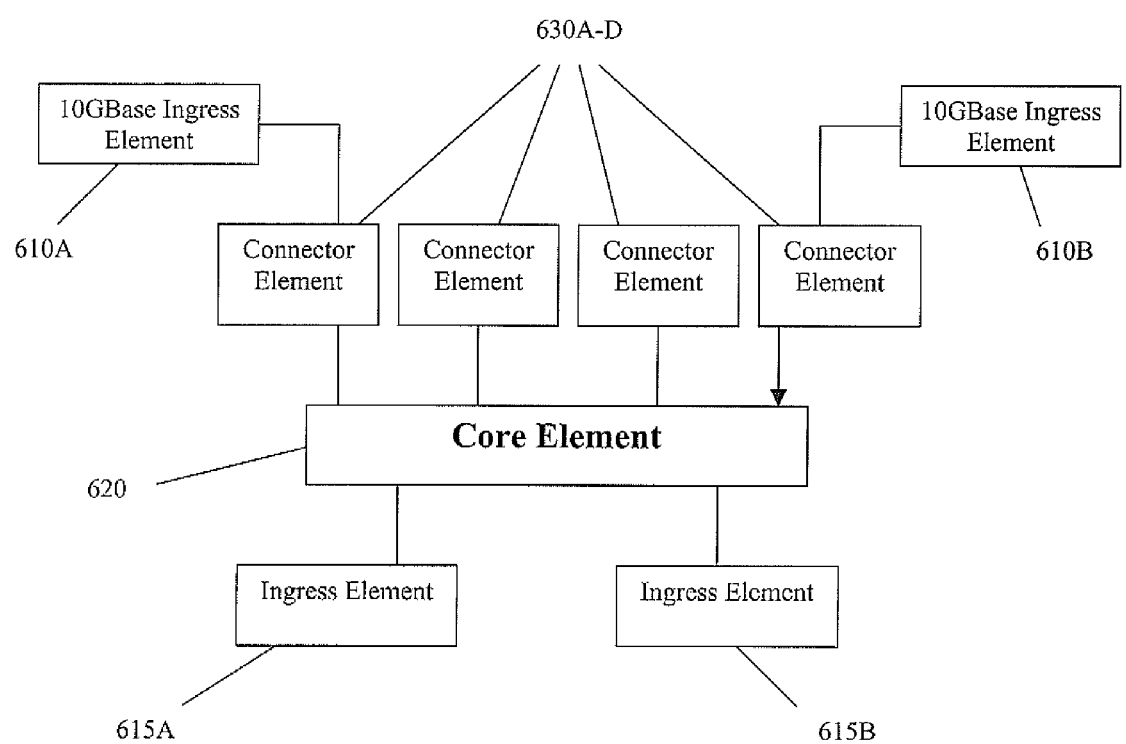
FIG. 6 is a schematic of a Raptor™ 1010 switch.

FIG. 6 is a schematic of a preferred commercial embodiment of a hybrid core-ingress device, designated as a Raptor™ 1010 switch. The switch 600 generally includes two 10 GBase ingress elements 610A-B, two ingress elements other than 10 GBase 615A-B, a core element 620, and intermediate connector elements 630A-D. The system is capable of providing 12.5 Gbps throughput.

Figure 7:
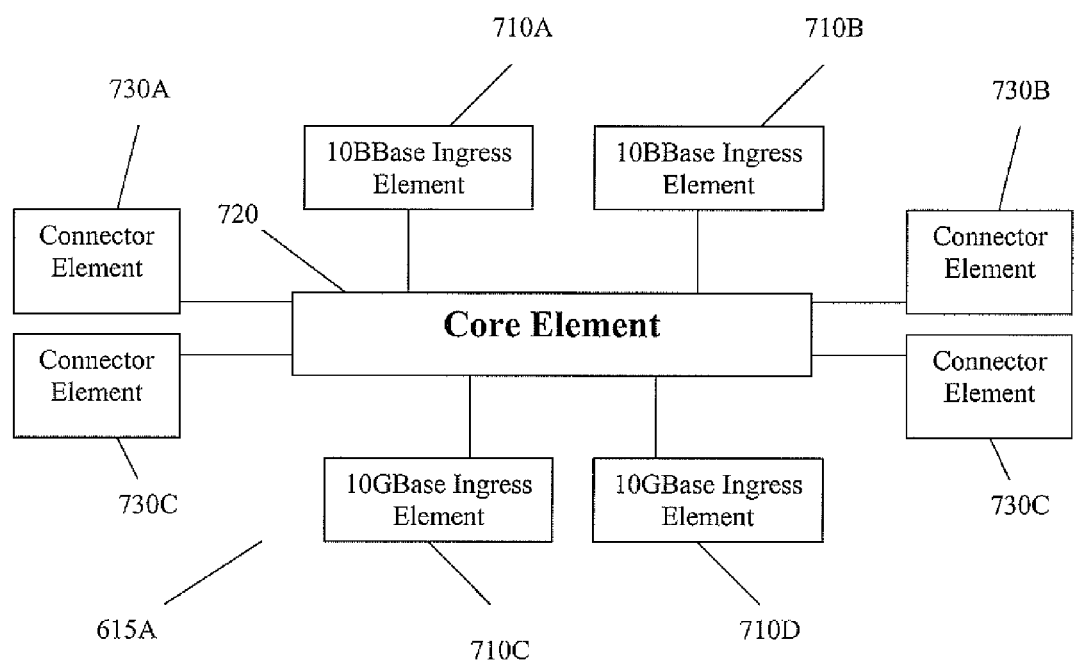
FIG. 7 is a schematic of a Raptor™ 1808 switch.

FIG. 7 is a schematic of a preferred commercial embodiment of a hybrid core-ingress device, designated as a Raptor™ 1808 switch. The switch 700 could include eight 10 GBase ingress elements 710A-D, a core element 720, or eight intermediate connector elements 730A-D, or any combination of elements up to a total of eight.

Figure 8:
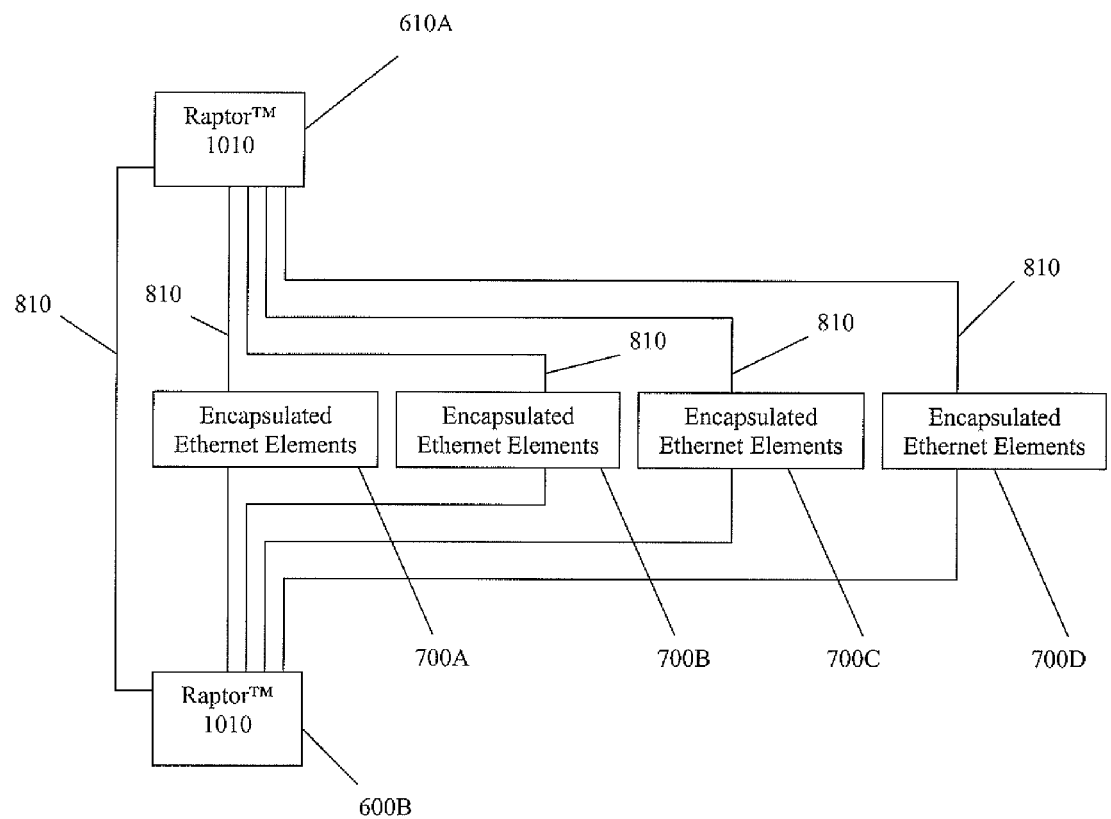
FIG. 8 is a schematic of an exemplary distributed switching system according to preferred aspects of the present invention.

In FIG. 8 a switching system 800 includes two of the Raptor™ 1010 switches 600A-B and four of the Raptor™ 1808 switches 700A-D, as well as connecting optical or other lines 810. The lines preferably comprise a 10 GB or greater backplane. In this embodiment the links between the 1010 switches can be 10-40 km at present, and possibly greater lengths in the future. The links between the core switches can be over 40 km.

Ethernet

A major advantage of the inventive subject matter is that it implements switching of Ethernet packets using a distributed switching fabric. Contemplated embodiments are not strictly limited to Ethernet, however. It is contemplated, for example, that an ingress element can convert SONET to Ethernet, encapsulate and route the packets as described above, and then convert back from Ethernet to SONET.

Topology

Switching systems contemplated herein can use any suitable topology. Interestingly, the distributed switch fabric contemplated herein can even support a mixture of ring, mesh, star and bus topologies, with looping controlled via Spanning Tree Avoidance algorithms.

The presently preferred topology, however, is a Strict Ring Topology (SRT), in which there is only one physical or logical link between elements. To implement SRT each source element address is checked upon ingress via any physical or logical link into a core element. If the source element address is the one that is directly connected to the core element, the data stream will be blocked. If the source element address is not the one that is directly connected to this core element, the package will be forwarded using the normal rules. A break in the ring can be handled in any of several known ways, including reversion to a straight bus topology, which would cause an element table update to all elements.

Management of the topology is preferably accomplished using element messages, which can advantageously be created and promulgated by an element manager unit (EMU). An EMU would typically manage multiple types of elements, including ingress/egress elements and core switching elements.

Management Discovery Protocol

In order for a distributed switch fabric to operate, all individual elements need to discover contributing elements to the fabric. The process is referred to herein as Management Discovery Protocol (MDP). MDP discovers fabric elements that contain individual management units, and decides which element become the master unit and which become the backup units. Usually, MDP needs to be re-started in every element after power stabilizes, the individual management units have booted, and port connectivity is established. The sequence of a preferred MDP operation is as follows:

Each element transmits an initial MDP establish message containing its MAC address and user assigned priority number (if assigned 0 used if not set). Each element also listens for incoming MDP messages, containing such information. As each element receives the MDP messages, one of two decisions is made. If the received MAC address is lower than the MAC address assigned to the receiving element, the message is forwarded to all active links with the original MAC address, the link number it was received on, and the MAC address of the system that is forwarding the message. If a priority is set, the lowest priority (greater than 0) is deemed as lowest MAC address and processed as such. If on the other hand the received MAC address is higher than the MAC address assigned to the receiving element, then the message is not forwarded. If a priority is set that is higher than the received priority, the same process is carried out Eventually the system identifies the MAC address of the master unit, and creates a connection matrix based on the MAC addresses of the elements discovered, the active port numbers, and the MAC addresses of each of the elements, as well as each of their ports. This matrix is distributed to all elements, and forms the base of the distributed switch fabric.

The matrix can be any reasonable size, including the presently preferred support for a total of 1024 elements.

As each new element joins an established cluster, it issues a MDP initialization message, which is answered by a stored copy of the adjacency table. The new element insert its own information into the table, and issues an update element message to the master, which in turn will check the changes and issue an element update message to all elements.

Heart Beat Protocol

Heart Beat Protocol enables the detection of a faked element. If an element fails or is removed from the matrix, a Heart Beat Protocol (HBP) can be used to signal that a particular link to an element is not in service. Whatever system is running the HBP sends an element update message to the master, which then reformats the table, and issues an element update message to all elements.

It is also possible that various pieces of hardware will send an interrupt or trap to the manager, which will trigger an element update message before HBP can discover the failure. Failure likely to be detected early on by hardware include; loss of signal on optical interfaces; loss of connectivity on copper interfaces; hardware failure of interface chips. A user selected interface disable command or shutdown command can also be used to trigger an element update message.

Traffic Load

Traffic Load factors can be calculated in any suitable manner. In currently preferred systems and methods, traffic load is calculated by local management units and periodically communicated in element load messages to the master. It is contemplated that such information can be used to load balance multiple physical or logical links between elements.

Security

Element messages are preferably sent using a secure data protocol (SDP), which performs an ACK/NAK function on all messages to ensure their delivery. SDP is preferably operated as a layer 2 secure data protocol that also includes the ability to encrypt element messages between elements.

As discussed elsewhere herein, element messages and SDP can also be used to communicate other data between elements, and thereby support desired management features. Among other things, element messages can be used to support Port To Port Protocol (PTPP), which provides a soft permanent virtual connection to exist between element/port pairs. As currently contemplated, PTPP is simply an element-to-element message that sets default encapsulation to a specific element address/port address for source and destination. PTPP is thus similar to Multiprotocol Label Switching (MPLS) in that it creates a substitute virtual circuit. But unlike MPLS, if a failure occurs, it is the "local" element that automatically re-routes data around the problem. Implemented in this manner, PTPP allows for extremely convenient routing around failures, provided that another link is available at both the originating (ingress) side and the terminating (egress) side, and there is no other blockage in the intervening links (security/Access Control List (ACL)/Quality of Service (QoS), etc), It is also possible to provide a lossless failover system that will not lose a single packet of data in case of a link failure. Such a system can be implemented using Active/Active Protection Service (AAPS), in which the same data is sent in a parallel fashion. The method is analogous to multicasting in that the hardware copies data from the master link to the secondary link. Ideally, the receiving end of the AAPS will only forward the first copy of any data received (correctly) to the end node.

Super Fabric

Large numbers of elements can advantageously be mapped together in logical clusters, and addressed by including destination and source cluster IDs in the switching headers. In one sense, cluster enabled elements are simply normal elements, but with one or more links that are capable of adding/subtracting cluster address numbers. A system that utilizes clusters in this manner is referred to herein as a super fabric. Super fabrics can be designed to any reasonable size, including especially a current version of super fabric that allows up to 255 clusters of 1024 elements to be connected in a "single" switch system.

As currently contemplated, the management unit operating in super fabric mode retains details about all clusters, but does not MAC address data. Inter-cluster communication is via dynamic Virtual LAN (VLAN) tunnels which are created when a cluster level ACL detects a matched sequence that has been predefined. Currently contemplated matches include any of: (a) a MAC address or MAC address pairs; (b) VLAN ID pairs; (c) IP subnet or subnet pair; (d) TCP/UDP Protocol numbers or pairs, ranges etc; (e) protocol number(s); and (f) layer 2-7 match of specific data. The management unit can also keep a list of recent broadcasts, and perform a matching operation on broadcasts received. Forwarding of previously sent broadcasts can thereby be prevented, so that after a learning period only new broadcasts will forwarded to other links.

Although clusters are managed by a management unit, they can continue to operate upon failure of the master. If the master management unit fails, a new master is selected and the cluster continues to operate. In preferred embodiments, any switch unit can be the master unit. In cases where only the previous management has failed, the ingress/egress elements and core element are manageable by the new master over an inband connection.

Inter-cluster communication is preferably via a strict PTPP based matrix of link addresses. When a link exists between elements that received encapsulated packets, MDP discovers this link, HBP checks the link for health, and SDP allows communication between management elements to keep the cluster informed of any changes. If all of the above is properly implemented, a cluster of switch elements can act as a single logical Gigabit Ethernet or 10 Gigabit Ethernet LAN switch, with all standards based switch functions available over the entire logical switch.

The above-described clustering is advantageous in several ways.

- Link Aggregation IEEE 802.3ad can operate across the entire cluster. This allows other vendors' systems that use IEEE 802.3ad to aggregate traffic over multiple hardware platforms, and provides greater levels of redundancy than heretofore possible.
- Virtual LANs (VLANs) 802.1Q can operate over the entire cluster without the need for VLAN trunks or VLAN tagging on inter-switch links. Still further, port mirroring (a defacto standard) is readily implemented, providing mirroring of any port in a cluster to any other port in the cluster.
- Pause frames received on any ingress/egress port can be reflected over the cluster to all ports contributing to the traffic flow on that port, and pause frames can be issued on those contributing ports to avoid bottlenecks.
- ISO Layer 3 (IP routing) operates over the entire cluster as though it was a single routed hop, even though the cluster may be geographically separated by 160 Km or more.

ISO Layer 4 ACLs can be assigned to any switch element in the cluster just as they would be in any standard layer 2/3/4 switch, and a single ACL may be applied to the entire cluster in a single command.

IEEE 802.1X operates over the entire cluster, which would not the case if a standard set of switching systems were connected.

Figure 9:
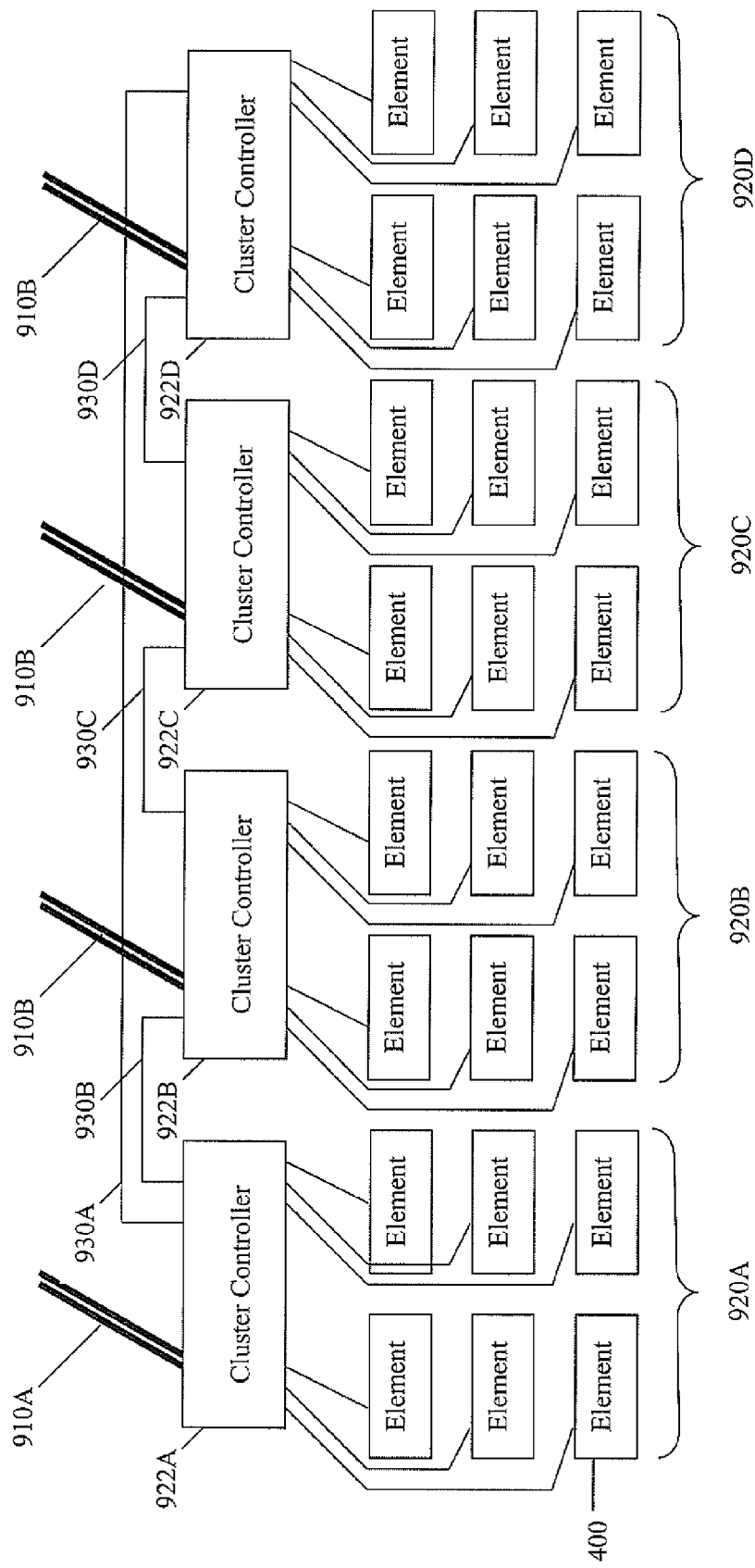
FIG. 9 is a schematic of a super fabric implementation of a distributed switching fabric.

In FIG. 9, a super fabric implementation 900 of a distributed switching fabric generally includes four 20 Gbps pipes 910A-D, each of which is connected to a corresponding cluster 920A-D that includes a control element 922A-D that understand the cluster messaging structure. Within each cluster there are numerous ingress/egress elements 400 coupled together. In this particular embodiment there each of the control elements 922A-D has two 10 Gbps pipes that connect the ingress/egress elements 400 for intra-cluster communication. There are also inter-cluster pipes 930A-D, which in this instance also communicate at 10 Gbps.

Thus, specific embodiments and applications of distributed switching fabric switches have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A system for transmitting a packet from a first switch to a third switch through an intervening second switch, comprising:

each of the switches are networked data switches, each have elements that interconnect at layer 2 of OSI model, and the first switch has address information of egress elements of the third switch;

the switches are not configured to transport the packet using a virtual LAN;

the first switch is configured to dynamically select among alternate Ethernet paths for transmitting the packet;

the first switch configured to add to packet addressing information for a selected one of the egress elements of the third switch; and the first and third switches operatively coupled with each other by optic fiber over a distance of at least 10 Km.

2. The system of claim 1, wherein each of the switches has a XAUI interface.

3. The system of claim 1, each of the switches further comprising a converter that converts XAUI to XFP.

4. The system of claim 3, wherein the converter (phy) includes four lanes, each of which operates at a rate of at least 3.125 Gbps.

5. The system of claim 1, wherein the switches are situated at a distance of at least 40 Km from one another.

6. The system of claim 1, wherein the switches situated at a distance of at least 150 Km from one another.

7. The system of claim 1, wherein the switches execute protocols that establish a stateful connection between the switches.

8. The system of claim 1, wherein each of the switches further includes a copper connection.

* * * * *